Aug. 6, 1963     W. H. THORPE     3,099,926
AUTOMATIC TRANSMISSION ASSEMBLY
Filed Oct. 24, 1960
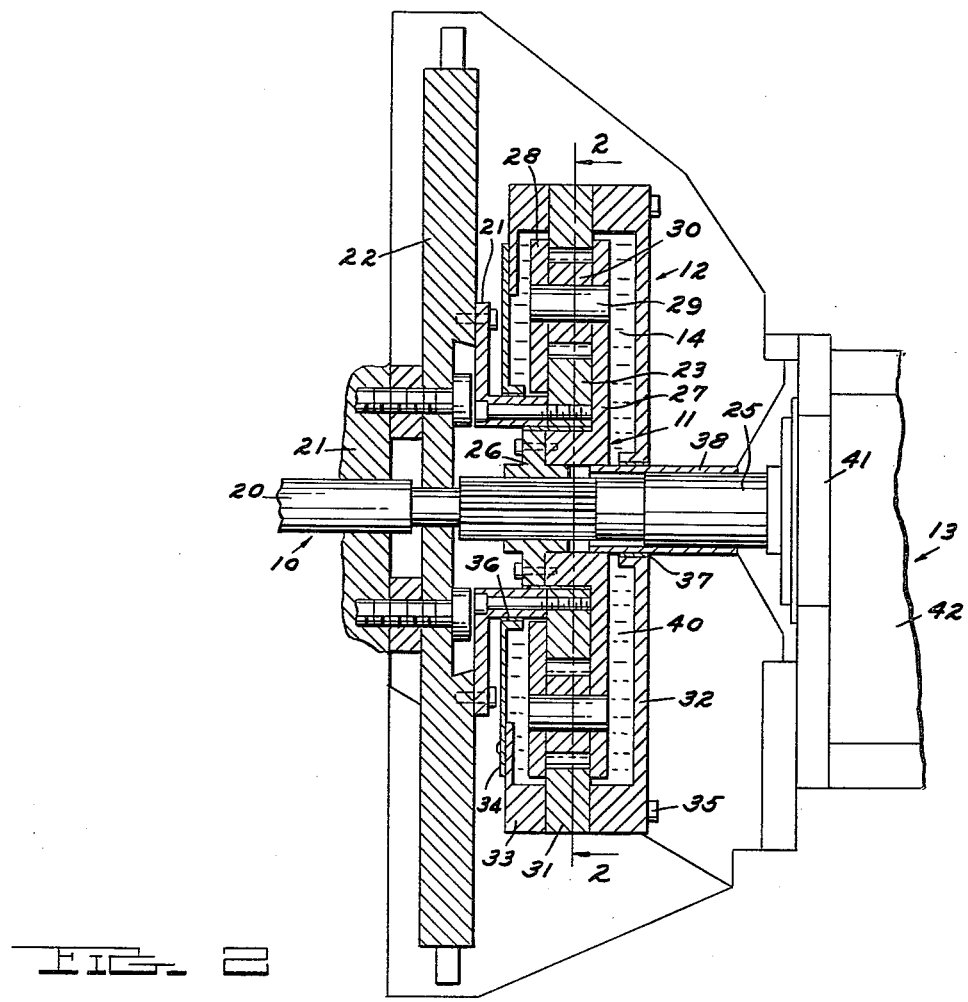
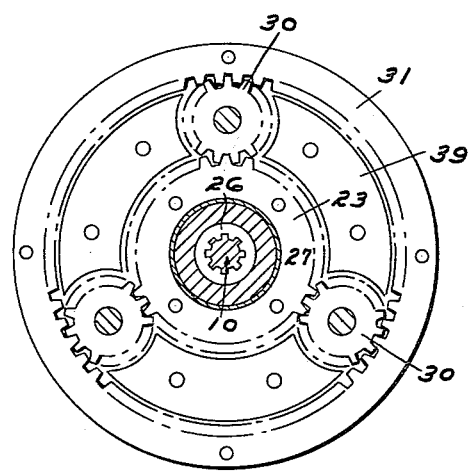
INVENTOR.
WALTER H. THORPE
BY
ATTORNEY

United States Patent Office 3,099,926
Patented Aug. 6, 1963

3,099,926
AUTOMATIC TRANSMISSION ASSEMBLY
Walter H. Thorpe, 9403 Somerset Ave., Detroit 24, Mich.
Filed Oct. 24, 1960, Ser. No. 64,359
3 Claims. (Cl. 74—752)

This invention relates generally to power transmissions and more particularly pertains to an automatic drive transmission having combined gear reaction and fluid coupling characteristics.

Automatic transmissions with fluid couplings have been employed heretofore to facilitate the application of torque in a gradual manner initially with subsequent lock-up, however, the several devices of the prior art have not proven entirely satisfactory inasmuch as they are complicated in design and construction, expensive to manufacture, and difficult to control in use.

With the foregoing in view, the primary object of the invention is to provide an automatic transmission device which is simple in design and construction, inexpensive to manufacture, and easy to use, and which is easily automatically controlled in use.

An object of the invention is to provide a planetary gear set in a fluid chamber wherein the fluid is relatively freely-plastic upon initiation of drive permitting relative rotation and consequent gear reduction and subsequently relatively non-plastic blocking the relative rotation between the gears and effecting direct drive.

An object of the invention is to provide a transmission whose characteristics are variable by the use of various kinds of fluids.

An object of the invention is to provide a freely-floating fluid reacted ring gear permitting relative rotation upon application of drive and subsequently preventing relative rotation and effecting direct drive through centrifugal force throwing the fluid in blocking relationship and preventing ring gear relative rotation.

An object of the invention is to provide a freely-floating ring gear in a planetary system which is relatively unimpeded in periods of low rotational velocity permitting relative rotation of the gears in the system and wherein the ring gear is prevented from rotating relative to the planet gears during periods of high velocity by the fluid packing the teeth for both the ring gear and planet gears thereby locking the planetary system in direct drive relationship.

An object of the invention is to provide a transmission which is flexible and which can be built in various sizes and dimensions to suit the particular use to which it is adapted.

These and other objects of the invention will become apparent by reference to the following description of an automatic transmission device embodying the invention taken in connection with the accompanying drawing in which:

FIG. 1 is an axial cross-sectional view of the device including driving and driven means partly broken away; and FIG. 2 is a reduced cross-sectional view of FIG. 1 taken on a line 2—2 thereof.

Referring now to the drawing wherein like numerals refer to like corresponding parts throughout the several views, the automatic transmission device shown therein to illustrate the invention comprises a driving means 10 powering the planetary gear set 11 enclosed within the fluid chamber 12 imparting drive to the driven means 13 via the reaction of the fluid 14 with the planetary gear set 11 as hereinafter set forth.

More particularly, the drive means include a drive shaft 20 and flange 21, supporting the fly-wheel 22 which is connected to the sun gear 23 via the coupling annular flange 24. The driven means 13 include a driven shaft 25, an annular flange 26 splined thereon connected to the planet-carrier rear plate 27 which is connected to the planet-carrier front plate 28 via the arcuate spacer plates 39 and pins 29 upon which the planets 30 are rotationally pivoted in mesh with the sun gear 23; it is obvious that at this point if the planets are permitted to variably rotate that a variable drive will occur between the driving means 10 and the driven means 13 and if the planet gears 30 are prevented from rotating that the drive between the driving means 10 and the driven means 13 is locked-up in a one-to-one relationship.

The fluid housing 12 includes the ring gear 31 meshing with the planet gears 30 and it is to be noted that the ring-gear body extends between the planet carrier back plate 27 and front plate 28 so as to be located and held in proper position. The fluid housing back plate 32, front plate 33, and cover 34 are bolted to the ring gear via the bolts 35. A seal 36 lies between the cover 34 and the annular flange 24; a seal 37 seals between the back-cover plate 32 and the driven shaft 25 bushing 38. It can now be seen at this point that by permitting free rotation of the ring gear 31, the planet gears 30 are in unlocked condition; whereas, by preventing relative rotation of the ring gear 31 relative to the planet gears 30, they are in locked condition as hereinbefore stated.

The fluid 14 is co-ordinated and adapted to the size of the fluid chamber, the amount of horsepower to be transmitted, the ratio extent of the gears, and other variables as is well understood in the art.

Spacer plates 39 are provided between a carrier back plate 27 and front plate 28 further strengthening the integration of the plates in support of the pins 29. The plates 39 also are adapted to surround the planet gears in their area between the sun and ring gears so as to confine the fluid in the adjacent teeth of the planet gears to effect fluid loading of the teeth to prevent rotation of the planet gears.

It can now be seen that the drive between the driving means 10 and driven means 13 is variably controlled by the fluid and velocity effecting the relative rotation of the planets relative to the ring gear 31.

Various fluids have been used in the chamber 14 such as sewing machine oil, engine crank case oil, hypoid gear oil, heavy transmission grease, and putty in combination with graphite; all have been found to operate successfully and to desirably vary the operation reaction to suit various loads and desired characteristics of drive. The driven means 13 may include a clutch 41 and a set of manually shiftable gears, not shown, in the gear box 42.

In operation, the user disengages the clutch 41 and starts the motor, not shown, powering the drive shaft 20 whereupon the fly-wheel 22 and novel transmission are moving; upon the operator selecting a gear ratio 40 in the box 42 and engaging the clutch 41 the load is applied to the driven shaft 25. The initial inertia of the applied load, until acceleration achieved, stops the driven shaft 25 to which the planet carrier 11 is attached whereupon the planet gears 30 rotate rapidly throwing the ring gear 31 into reverse rotation which is resisted by the fluid 40 in the coupling causing the ring gear rotation to slow down so that drive is gradually imparted through the planetary set and upon further acceleration of the motor and drive shaft 20, the rapidly rotating housing 12 throws the fluid 40 therein to the outer peripheral wall forcing the fluid into the teeth of the ring gear 31 and planet gears 30 blocking their meshing thereby fluid-wise reacting the planetary gear set to slow down the rotation of the ring gear 31 and planets 30 thereby gradually imparting drive to the driven means 13. Upon obtaining running speed in the driving and driven means the reverse rotation of the ring gear 31 is prevented by the centrifugally packed fluid in the teeth of the ring gear 31 and planet gears 30 causing a one-to-one lock-up drive between the driving means 10 and the driven means 13.

Although but a single embodiment of the invention has been shown and described in detail it is obvious that many changes may be made in the size, shape, detail, and arrangement of the various elements of the invention within the scope of the appended claims.

I claim:

1. A device for automatically gradually transferring drive power from one member to another member comprising driving means, a sun gear driven by said driving means, planet gears meshing with said sun gear, a planet carrier rotatably supporting and positioning said planet gears, driven means connected to said planet carrier, a ring gear surrounding and meshing with said planet gears, chamber forming members on either side of said ring gear extending radially inwardly locating said ring gear and meshing planet gears in the radially outer area of the chamber formed by said members; said ring gear and said chamber forming members being freely rotatably supported relative to said other parts; fluid sealing means between said driving means and one said chamber forming member, sealing means between said driven means and said other chamber forming member; said ring gear and chamber forming members and seals forming a fluid tigrt chamber enclosing said sun, ring, and planet gears; and plastic fluid in said chamber impeding the free rotation of said gears; said device transmitting drive from said driving to said driven means via said sun gear, planet gears, and planet carrier via ring gear reaction as variably rotatably impeded by said fluid to permit relative rotation between said driving and driven means resulting in gradual application of drive upon initiation and subsequently said fluid preventing gear rotation resulting in direct application of drive by loading said gears in their teeth area via centrifugal force generated by rotation.

2. A gear reacted fluid coupling comprising a sun gear for connection to driving means, planet gears meshing with said sun gear, a planet carrier supporting said planet gears, a ring gear meshing with said planet gears, a sealed housing attached to said ring gear for rotation therewith inclosing all said gears, and fluid in said housing immersing all said gears, said planet carrier being connectable to driven means; said device upon driving means initially rotating said sun gear permitting relative rotation between said sun gear and planet carrier via reverse rotation of said said ring gear, housing, and fluid; said fluid upon rotation of said ring gear and housing gradually packing the teeth of said ring gear via centrifugal force effecting gear reduction moving said planet carriers; said fluid under increased rotational velocity packing the teeth of said ring gear and planet gears preventing relative rotation therebetween with consequent prevention of relative rotation between said planet gears and said sun gear effecting a non-reduced drive between said sun gear, locked planet gears, and planet carrier.

3. A device for gradually transferring drive from a driving member to a driven member comprising,
a first shaft,
a sun gear fixed on said first shaft,
a second shaft,
a planet carrier fixed on said second shaft,
planet gears on said carrier meshing with said sun gear;
said planet gears permitting relative rotation between said sun gear on said first shaft and said carrier on said second shaft by free spinning,
said carrier comprising a first radial disk and a second radial disk axially spaced from said first radial disk;
said planet gears lying between said disks;
pins disposed between said radial disks supporting said planet gears;
said sun gear having an outer edge lying between said disks surmounted by teeth meshing with said planet gears,
a ring gear surrounding said planet gears having internal teeth lying between said disks engaging said planet gears;
said ring gear freely rotating with planet gear rotation;
spacer blocks fixed between said carrier first and second disks lying closely adjacent said sun, ring, and planet gears preventing fluid flow between said disks except adjacent said gears;
chamber forming members having radial portions on either side of said carrier axially spaced therefrom and axial portions around said carrier radially spaced therefrom;
said chamber forming members connecting to and supporting said ring gear;
said chamber forming members forming a radial fluid chamber on either side of said carrier and said gears,
fluid in said chambers and between all said gears, members, and carrier;
said chamber forming members rotating with said ring gear imparting rotational movement to said fluid developing centrifugal force in said fluid driving said fluid radially outwardly;
rotational movement of said carrier and planet gears imparting rotational movement to said fluid driving said fluid radially outwardly;
said radially outwardly centrifugally driven fluid packing in the teeth of said ring gear and planet gears under pressure resisting displacement of said fluid by the teeth of the meshing ring and planet gears thereby impeding their free rotation relative to one another;
rotational impedance between said ring and planet gears to resisting rotation between said planet gears and said sun gear to effect rotational drive between said planet carrier and said second shaft on the one hand and said sun gear and said first shaft on the other hand,
drive means connected to one said shaft, and
driven means connected to the other said shaft.

References Cited in the file of this patent

UNITED STATES PATENTS

| | | |
|---|---|---|
| 1,077,371 | Selden | Nov. 4, 1913 |
| 2,080,291 | Miller | May 11, 1937 |
| 2,301,292 | Krick | Nov. 10, 1942 |
| 2,431,076 | Pepper | Nov. 18, 1947 |
| 2,764,903 | Miller | Oct. 2, 1956 |

FOREIGN PATENTS

| | | |
|---|---|---|
| 645,831 | Great Britain | Nov. 8, 1950 |